US012502326B2

(12) United States Patent
Trethowan et al.

(10) Patent No.: US 12,502,326 B2
(45) Date of Patent: Dec. 23, 2025

(54) ANIMAL CADAVER BAG

(71) Applicant: Orchid Valley Pet, LLC, Fruit Heights, UT (US)

(72) Inventors: Jahna Trethowan, Millendon (AU); Boyd Kezerian, Fruit Heights, UT (US)

(73) Assignee: Orchid Valley Pet, LLC, Fruit Heights, UT (US)

( * ) Notice: Subject to any disclaimer, the term of this patent is extended or adjusted under 35 U.S.C. 154(b) by 0 days.

(21) Appl. No.: 18/651,411

(22) Filed: Apr. 30, 2024

(65) Prior Publication Data

US 2025/0332052 A1 Oct. 30, 2025

(51) Int. Cl.
*A61G 17/06* (2006.01)

(52) U.S. Cl.
CPC .................................... *A61G 17/06* (2013.01)

(58) Field of Classification Search
CPC ....... A61G 17/06; B65D 33/06; B65D 33/105
See application file for complete search history.

(56) References Cited

U.S. PATENT DOCUMENTS 4,780,940 A * 11/1988 Jay ......................... A61G 17/06 27/28
4,790,051 A * 12/1988 Knight ..................... A61G 1/01 383/61.3
4,922,562 A * 5/1990 Allred .................... A61G 1/013 5/628
D409,817 S * 5/1999 Engerfalk ...................... D99/99
7,484,275 B2 * 2/2009 Carroll ............... A61G 17/0136 383/103
8,966,726 B2 * 3/2015 Chua ...................... A61G 17/06 383/66
9,216,128 B2 * 12/2015 Richardson ............ A61G 17/06
9,861,546 B2 * 1/2018 Fenton ............... A61G 17/0136
2001/0029955 A1 * 10/2001 Paschal, Jr. .......... A61G 10/005 128/846
2007/0009185 A1 * 1/2007 Lee ........................ A61G 17/06 383/18
2009/0007402 A1 * 1/2009 Carroll ................. A61G 17/007 27/28
2009/0080811 A1 * 3/2009 Stefanek ................ B65D 81/18 383/61.3
2011/0162178 A1 * 7/2011 Jensen ...................... B63C 7/16 27/28

(Continued)

FOREIGN PATENT DOCUMENTS

DE 202023107489 U1 * 2/2024
JP H0611732 U * 2/1994

*Primary Examiner* — William L Miller
(74) *Attorney, Agent, or Firm* — Workman Nydegger

(57) ABSTRACT

An animal cadaver bag includes a bag body with a top surface and a bottom surface. The top surface defines a bag opening for accessing a bag interior. The animal cadaver bag also includes one or more straps that define at least a first plurality of handles at a first side of the bag body and a second plurality of handles at an opposing second side of the bag body. The one or more straps define a plurality of strap segments that extends across the bottom surface of the bag body between the first plurality of handles and the second plurality of handles. At least a first strap segment of the plurality of strap segments and a second strap segment of the plurality of strap segments overlap one another to form a strap overlap region along the bottom surface of the bag body.

13 Claims, 8 Drawing Sheets

(56) References Cited

U.S. PATENT DOCUMENTS

| | | | | |
|---|---|---|---|---|
| 2013/0174392 A1* | 7/2013 | Chua | A61G 17/06 | 112/475.08 |
| 2014/0029872 A1* | 1/2014 | Ness | B65B 69/0008 | 383/12 |
| 2014/0259577 A1* | 9/2014 | Richardson | A61G 17/06 | 27/28 |
| 2014/0366342 A1* | 12/2014 | Fenton | A61G 17/06 | 29/428 |
| 2016/0101009 A1* | 4/2016 | Newell | A61G 17/041 | 29/455.1 |
| 2021/0198011 A1* | 7/2021 | Park | B65D 33/105 | |
| 2023/0255847 A1* | 8/2023 | Cowan | A61G 17/007 | 27/28 |

* cited by examiner

100

100

500

ANIMAL CADAVER BAG

CROSS-REFERENCE TO RELATED APPLICATIONS

N/A

BACKGROUND

Handling the loss of a pet can be an emotional journey. When a pet passes away, an immediate concern for many pet owners is how to properly care for the pet's remains, a process that varies widely depending on cultural, personal, and logistical considerations.

Pets can be laid to rest in numerous ways. Some pet owners choose burial, either in a pet cemetery or a special place that holds meaning for them (and/or their pet). This traditional method can allow for a physical space where grieving owners can visit and remember their pets. Pet cremation has also become a common choice, such as in urban areas or places where space is a constraint. Pet cremation can allow owners to keep their pet's ashes in an urn, scatter them in a meaningful location, or even incorporate them into memorial objects like jewelry. Some pet owners use bio-urns after cremation, where the pet's ashes contribute to the growth of a plant or tree. Some pet owners opt for pet aquamation, which is a water-based cremation method.

Animal cadaver bags, designed to handle the remains of deceased pets, play an important role in the respectful and hygienic management of animal remains. These bags are specifically crafted to contain and transport deceased animals from the place of death toward their final resting place, whether that be a crematorium, burial site, or other location (e.g., a veterinary facility for further examination).

The subject matter described and/or claimed herein is not limited to embodiments that operate only in environments or contexts such as those described above. Rather, this background is only provided to illustrate one exemplary technology area where some embodiments described herein may be practiced.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

DETAILED DESCRIPTION

Figure 1:
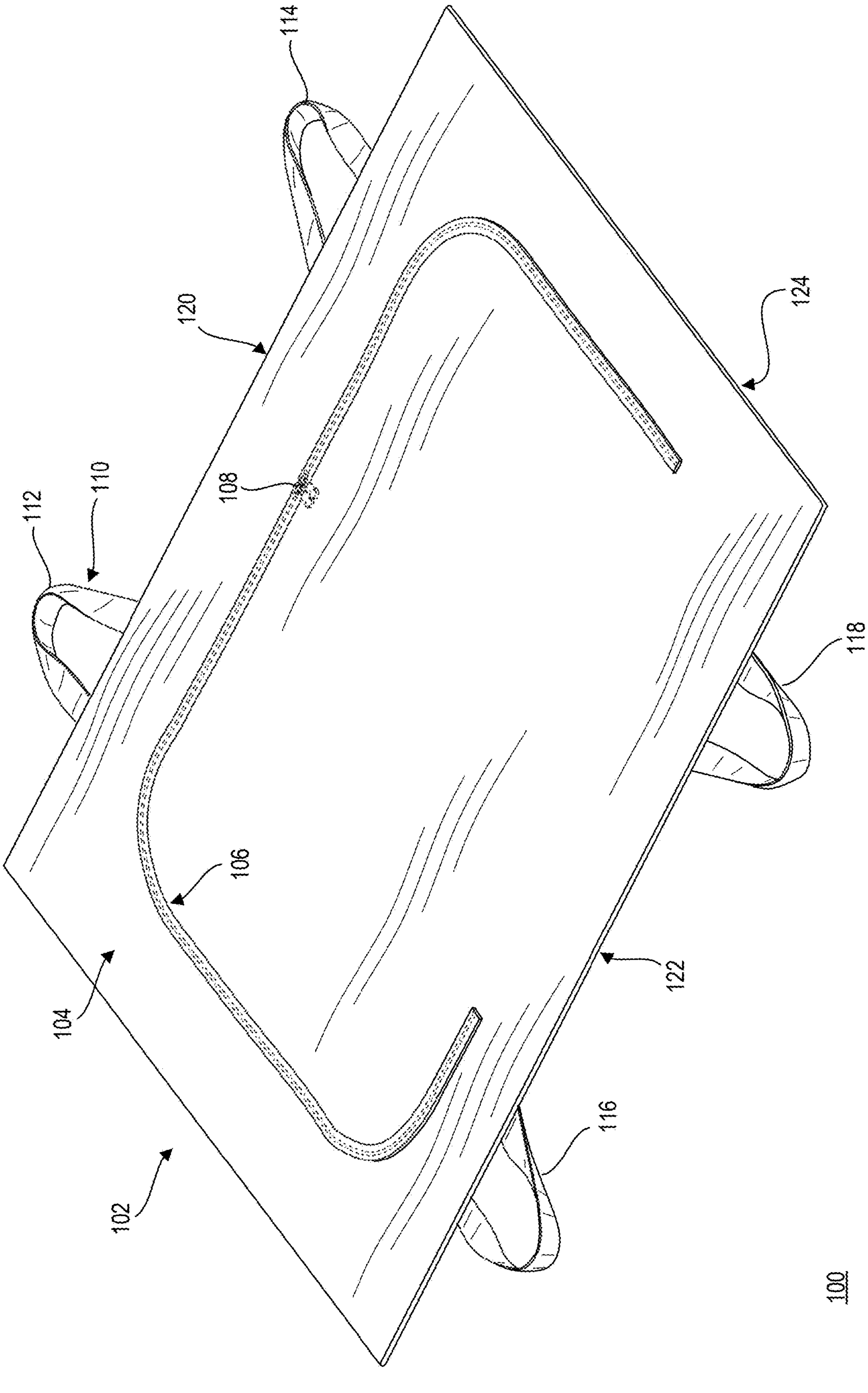
FIG. 1 illustrates a perspective view of an animal cadaver bag, in accordance with implementations of the disclosed subject matter.

Disclosed embodiments are directed to an animal cadaver bag. As noted above, animal cadaver bags are often used to contain and transport animal remains from the place of death toward a final resting place in a hygienic, respectful, and/or dignified manner. The use of cadaver bags is part of a broader trend towards professionalizing and personalizing the care of deceased pets.

Animal cadaver bags are often constructed from durable, leak-proof materials, which can ensure that the process of handling deceased pets minimizes health risks to humans and prevents the spread of diseases. Animal cadaver bags are typically designed to be strong and secure, with features like heavy-duty zippers, handles for ease of transport, and sometimes even tags for identification purposes. However, the use of conventional animal cadaver bags is associated with various challenges. For instance, while transporting a deceased animal placed in a conventional animal cadaver bag, the weight of the animal can cause sagging in the middle of the cadaver bag, especially where the cadaver bag includes handles that are used to assist with the transport. Such sagging can be distracting and can disturb the respectful nature of the transport.

At least some disclosed embodiments are directed to an animal cadaver bag that incorporates side handles that provide direct support to the middle region of the bottom of the cadaver bag, which is often the locus of sagging as described above. For example, an animal cadaver bag as disclosed herein can include a bag body that defines a bag interior. The bag body can include a top surface and an opposing bottom surface. The top surface defines a bag opening for accessing the bag interior, and the bag opening being selectively openable and closable. The animal cadaver bag can further include one or more straps that define a first plurality of handles at a first side of the bag body and a second plurality of handles at an opposing second side of the bag body. The strap(s) can define a plurality of strap segments that extends across the bottom surface of the bag body between the first handles and the second handles.

In one implementation, the plurality of strap segments of the animal cadaver bag can include: (i) a first strap segment extending from a first handle of the first plurality of handles to a first handle of the second plurality of handles, (ii) a second strap segment extending from the first handle of the first plurality of handles to a second handle of the second plurality of handles, (iii) a third strap segment extending from the first handle of the second plurality of handles to a second handle of the first plurality of handles, and (iv) a fourth strap segment extending from the second handle of the first plurality of handles to the second handle of the second plurality of handles.

In one implementation, the strap(s) of the animal cadaver bag define a first strap loop and a second strap loop. The first strap loop can be defined by: (i) a first handle of the first plurality of handles, (ii) a first handle of the second plurality of handles, (iii) a first strap segment of the plurality of strap segments that extends from the first handle of the first plurality of handles to the first handle of the second plurality of handles, (iv) a first part of a second strap segment of the plurality of strap segments that extends from the first handle of the first plurality of handles to a second handle of the second plurality of handles, and (v) a first part of a third strap segment of the plurality of strap segments that extends from the first handle of the second plurality of handles to a second handle of the first plurality of handles. The second strap loop can be defined by: (i) the second handle of the first plurality of handles, (ii) a second handle of the second plurality of handles, (iii) a second part of the second strap segment of the plurality of strap segments that extends from the first handle of the first plurality of handles to the second handle of the second plurality of handles, (iv) a second part of the third strap segment of the plurality of strap segments that extends from the first handle of the second plurality of handles to the second handle of the first plurality of handles, and (v) a fourth strap segment of the plurality of strap segments that extends from the second handle of the first plurality of handles to the second handle of the second plurality of handles.

In one implementation, at least a first strap segment and a second strap segment of the plurality of strap segments of the cadaver bag overlap one another to form a strap overlap region along the bottom surface of the bag body.

Providing animal cadaver bags with one or more features described herein can improve the support for the bodies of deceased animals within the cadaver bags during transport, which can ameliorate sagging effects, and which can contribute to the decorum of such transports.

Having described various high-level features of the disclosed subject matter, attention will now be directed to the Figures, which provide supporting illustrations related to the disclosed subject matter. The specific examples depicted in the Figures are provided for illustrative purposes and should not be construed as limiting the scope of the appended claims.

FIG. 1 illustrates a perspective view of an animal cadaver bag 100, which includes a bag body 102 that defines a bag interior. The bag body 102 can be formed from any suitable material, such as polyethylene vinyl acetate (e.g., 200 or 300 micron PEVA, or any type of PEVA) or another biodegradable polymer (which can be cold crack resistant). The bag body 102 can be leak proof (e.g., via heat-sealed seams) and can be provided in any color or combination of colors (and/or opacity level). A bag body 102 can include an absorbent interior lining or pad, which can assist in managing fluid release associated with animal death or euthanasia. The bag body 102 can include other features not shown in the Figures (e.g., a document sleeve for housing an identification card or document). The bag body 102 shown in FIG. 1 includes a top surface 104 that defines a bag opening 106. The bag opening 106 can be selectively openable and closable to facilitate access to the bag interior. In the example shown in FIG. 1, the bag opening 106 includes a zipper system 108 (e.g., a heat-sealed two-way zipper) for achieving the selective opening and closing thereof. Other types of opening mechanisms may be utilized on an animal cadaver bag 100, in accordance with the disclosed subject matter.

The animal cadaver bag 100 of FIG. 1 also includes one or more straps 110 that define handles 112, 114, 116, and 118 of the animal cadaver bag 100. In the example shown in FIG. 1, handles 112 and 114 are positioned at or near side 120 of the bag body 102, while handles 116 and 118 are positioned at or near side 122 of the bag body 102. For instance, individuals using the animal cadaver bag 100 may lay the animal cadaver bag 100 on the ground, open the bag opening 106 via the zipper system 108, place a deceased animal within the bag interior via the bag opening 106, close the bag opening 106 via the zipper system 108, and access handles 112 and 114 via at side 120 and handles 116 and 118 at side 122 to transport the animal cadaver bag 100 along with the deceased animal to a desired location.

As will be described hereinbelow, the strap(s) 110 that form the handles 112, 114, 116, and 118 may be arranged or configured to support the weight of the deceased animal within the bag body 102 at or near the center of a bottom surface 124 of the bag body 102, which can mitigate sagging effects. Although FIG. 1 illustrates an embodiment in which the animal cadaver bag 100 includes four handles, any quantity of handles may be implemented on an animal cadaver bag 100, in accordance with the disclosed subject matter.

Figure 2:
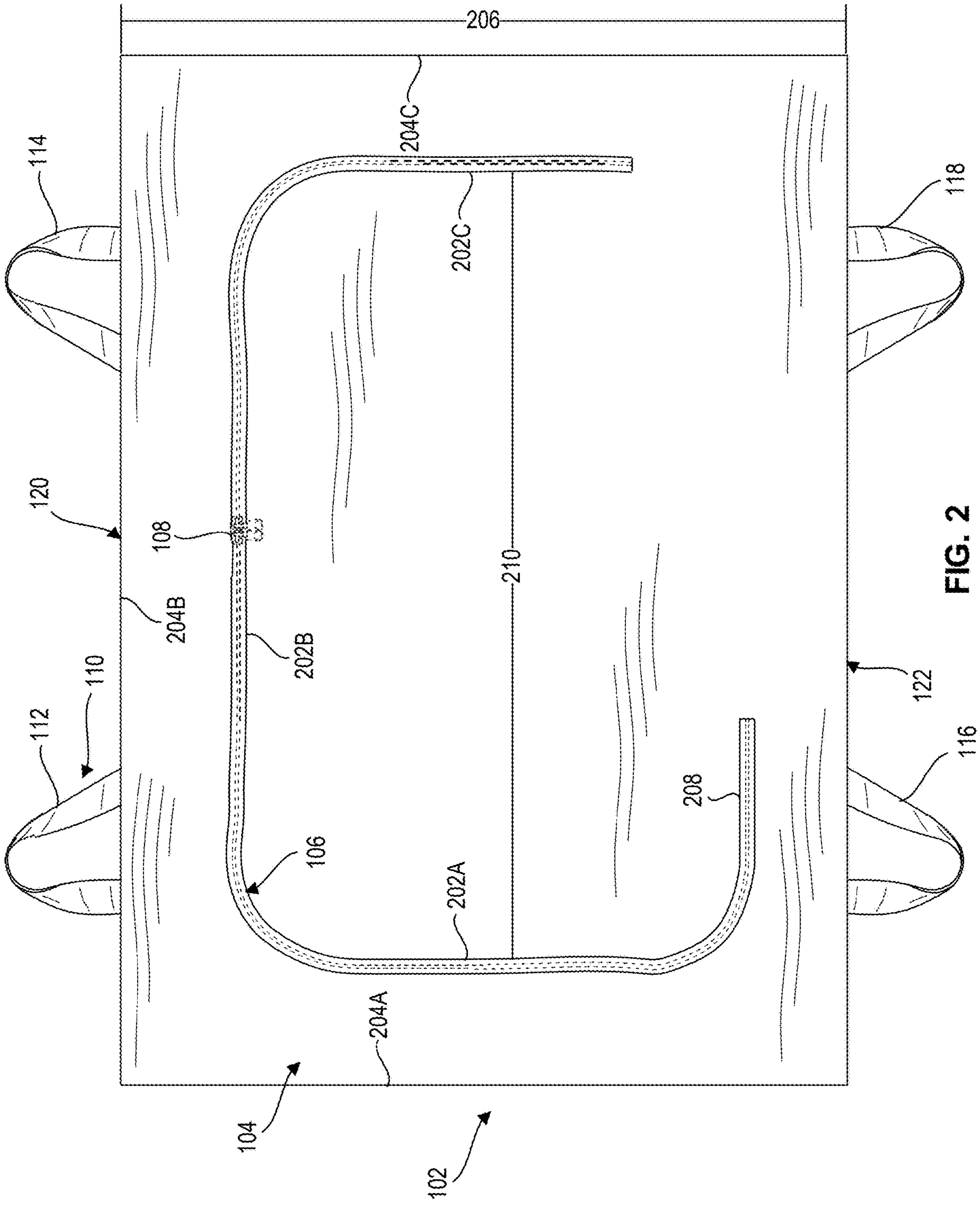
FIG. 2 illustrates a top view of an animal cadaver bag, in accordance with implementations of the disclosed subject matter.

FIG. 2 illustrates a top view of the animal cadaver bag 100 shown in FIG. 1. In the example shown in FIG. 2, the top surface 104 of the animal cadaver bag 100 has a rectangular shape, which can be adapted to fit the size of a deceased animal (e.g., a pet, such as a dog or a cat, etc.). An animal cadaver bag 100 can be provided in different shapes and/or sizes to accommodate different sizes of animals. For example, a bag body 102 can comprise a size of 13.7"×9.5", 25.5"×17.7", 31.4"×21.6", 43.3"×31.5", 55"×37.4", or any other size. FIG. 2 furthermore illustrates an example in which the bag opening 106 is defined by linear segments 202A, 202B, and 202C that are connected to one another and that are inwardly offset from corresponding linear segments 204A, 204B, and 204C of the border of the top surface 104. In the example shown, the bag opening 106 forms the general shape of three sides of a rectangle with soft corners, defined by the linear segments 202A, 202B, and 202C and the connecting or corner segments therebetween. Other shapes of the bag opening 106 of an animal cadaver bag 100 are within the scope of the present disclosure.

The bag opening 106 shown in FIG. 2 also includes a partial segment 208. The partial segment 208 can include a corner segment and a linear segment and can extend from an adjacent linear segment 202A. The partial segment 208 can extend from the adjacent linear segment 202A to an opposing linear segment 202C by a distance that is less than about 50% of a distance 210 between the adjacent linear segment 202A and the opposing linear segment 202C. The partial segment 208 can extend from the adjacent linear segment 202A to the opposing linear segment 202C by other proportions of the distance 210, such as less than 45%, 40%, 35%, 30%, 25%, 20%, 15%, or any value within a range with endpoints defined by any of these values.

The partial segment 208 can enable users to conveniently and selectively open a corner of the bag opening 106, such as by bringing one zipper to the terminal end of the partial segment 208 and bring the other zipper to a point along the adjacent linear segment 202A. Selective opening of the corner of the bag opening 106 can enable placement of an animal within the bag body 102 with the head of the animal aligned with and exposed by the open corner of the bag opening 106 while other portions of the animal's body remain covered by the bag body 102. Such functionality can enable pet owners to experience final interactions with their pets in a dignified manner. For instance, a pet may be placed in the bag body 102 with its head aligned with the open corner of the bag opening 106 as described above. The pet owner may thus engage with the pet's face during the pet's final moments (e.g., pursuant to a euthanasia operation). During these final moments, the remainder of the pet's body may remain occluded by the bag body 102, which can occlude fluid release from the pet's body associated with euthanasia and can prevent such occurrences from interfering with the pet owner's final interaction with their pet. After the pet has passed on, the corner of the bag opening 106 may be closed, and the remains of the pet may be handled in a dignified manner.

Advantageously, when in a fully open configuration (e.g., with both zippers of the zipper system 108 drawn to opposing terminal ends of the bag opening 106), the bag opening 106 can enable uncovering of at least 30% of the top surface 104 to expose the bag interior within the bag body 102, such as by displacing a flap formed by part of the top surface 104 when the bag opening 106 is in the fully open configuration. Such a configuration can enable users to easily place a deceased animal within the bag interior. The bag opening 106 can enable other proportions of the top surface 104 to become uncovered to expose the bag interior, such as 35%, 40%, 50%, 55%, 60%, 65%, 70%, 75%, 80%, 85%, 90%, 95%, 100%, or any value within a range with endpoints defined by any of these values.

FIG. 2 also illustrates an example in which the handles 112, 114, 116, and 118 extend outward (e.g., away from) the bag body 102 by a limited distance, such as a distance less than 30% of the width 206 of the bag body 102 between (i) handles 112 and 114 and (ii) handles 116 and 118. Such a configuration can enable users to maintain a close distance between their grip on the handles 112, 114, 116, and 118 and the load being supported (e.g., the deceased animal within the bag interior of the bag body 102), which can improve stabilized control of transport operations. The handles can extend outward from the bag body 102 distances defined by other proportions of the width 206 of the bag body 102, such as 25%, 20%, 15%, 10%, 5%, 0%, or any value within a range with endpoints defined by any of these values.

Figure 3:
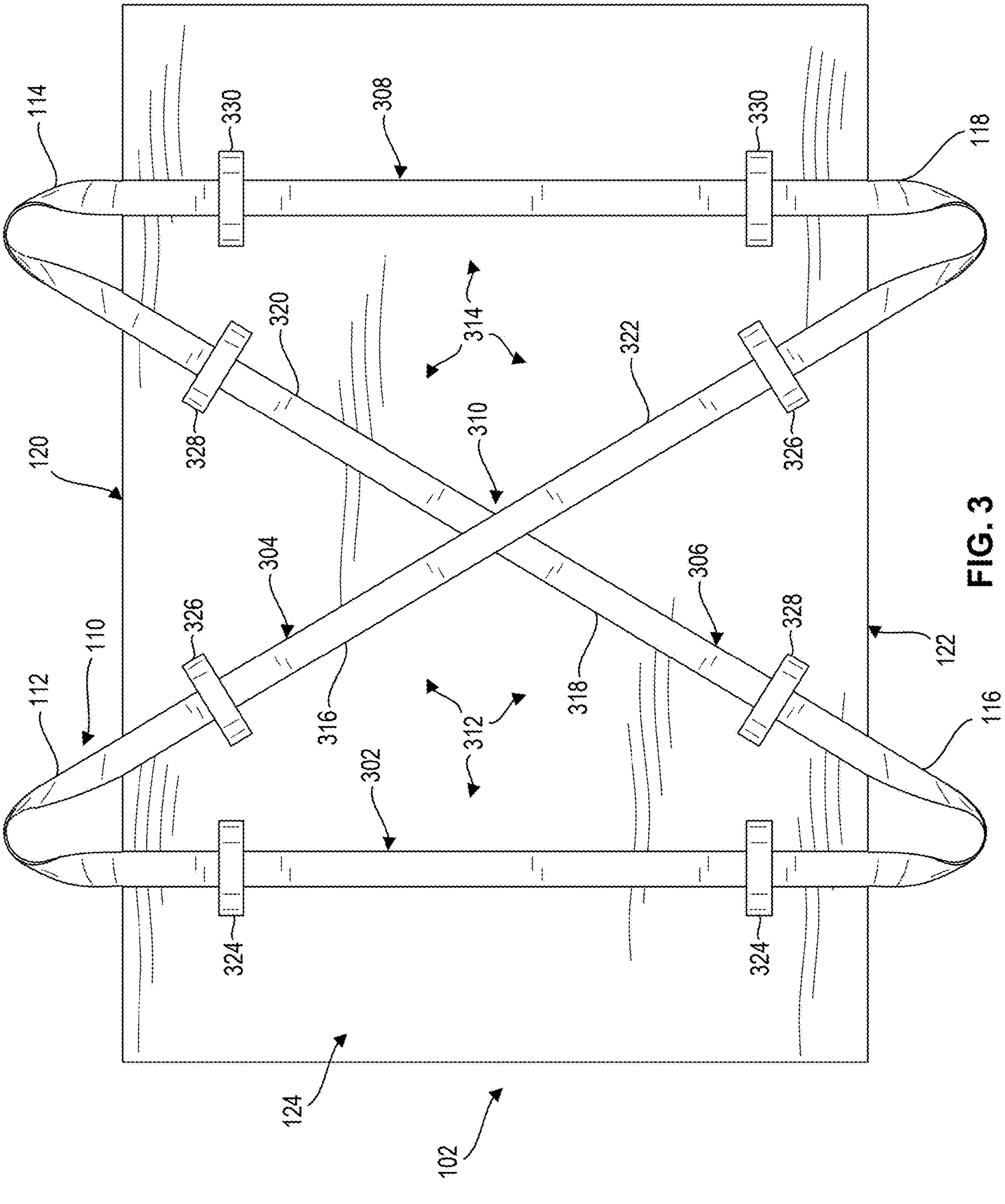
FIG. 3 illustrates a bottom view of an animal cadaver bag, in accordance with implementations of the disclosed subject matter.

FIG. 3 illustrates a bottom view of the animal cadaver bag 100 shown in FIGS. 1 and 2. FIG. 3 shows additional aspects of the strap(s) 110 that define the handles 112, 114, 116, and 118. For instance, FIG. 3 illustrates an example in which the strap(s) 110 define strap segments 302, 304, 306, and 308, which are shown as extending across the bottom surface 124 of the bag body 102 so as to connect handles on different sides 120 and 120 of the bag body 102.

In the example shown in FIG. 3, strap segment 302 extends between handle 112 and handle 116, strap segment 304 extends between handle 112 and handle 118, strap segment 306 extends between handle 116 and handle 114, and strap segment 308 extends between handle 114 and handle 118. FIG. 3 furthermore shows an example in which strap segments 304 and 306 form an x shape along the bottom surface 124 of the bag body 102 and overlap one another, thereby forming a strap overlap region 310 along the bottom surface 124 (e.g., at a center region of the bottom surface 124).

In the example shown in FIG. 3, the strap(s) 110 define strap loops 312 and 314. Strap loop 312 is illustrated in FIG. 3 as being defined by part 316 of strap segment 304 (e.g., where part 316 of strap segment 304 extends between the strap overlap region 310 and handle 112), handle 112, strap segment 302, handle 116, and part 318 of strap segment 306 (e.g., where part 318 of strap segment 306 extends between the strap overlap region 310 and handle 116). Strap loop 314 is illustrated in FIG. 3 as being defined by part 320 of strap segment 306 (e.g., where part 320 of strap segment 306 extends between the strap overlap region 310 and handle 114), handle 114, strap segment 308, handle 118, and part 322 of strap segment 304 (e.g., where part 322 of strap segment 304 extends between the strap overlap region 310 and handle 118).

The arrangement of the overlap region 310 and the strap segments 302, 304, 306, and 308 as described above can facilitate distribution of forces exerted downward on the center region of the bottom surface 124 (e.g., gravitational forces exerted by a deceased animal within the bag interior of the bag body 102 during transport) to members connected thereto (e.g., handles 112, 114, 116, and 118), which can mitigate sagging effects during transport of a load placed within the bag body 102 (e.g., a deceased animal).

The strap(s) 110 that define the handles 112, 114, 116, and 118 and the strap segments 302, 304, 306, and 308 may comprise a single strap or a series of interconnected straps of any type (e.g., one or more heat-sealed straps). In some implementations, the strap(s) 110 are not directly adhered, sewn, or otherwise fixedly attached to the bag body 102. For example, the strap(s) 110 can be slidably secured to the bag body 102 or secured to the bag body 102 by strap guides or other conduit-like members at fixed positions on the bag body 102 so as to permit translation of the strap(s) 110 to different positions relative to the bag body 102 while maintaining physical tethering of the strap(s) 110 to the bag body 102. Such a configuration can mitigate concentrated transference of forces to the bag body 102 during transport operations.

For instance, FIG. 3 illustrates an example in which the animal cadaver bag 100 includes strap guides 324 that secure strap segment 302 to the bottom surface 124 of the bag body 102, strap guides 326 that secure strap segment 304 to the bottom surface 124 of the bag body 102, strap guides 328 that secure strap segment 306 to the bottom surface 124 of the bag body 102, and strap guides 330 that secure strap segment 308 to the bottom surface 124 of the bag body 102. The strap guides 324, 326, 328, and 330 (and/or other strap guides described herein) can be formed from the same material as the bag body 102 or from another material. The strap guides 324, 326, 328, and 330 can be connected to the bottom surface 124 of the bag body 102 on or near opposing ends thereof (or any two points along the length thereof) to form an opening between the bottom surface 124 and the strap guides 324, 326, 328, and 330 through which a strap segment may extend.

Figure 4:
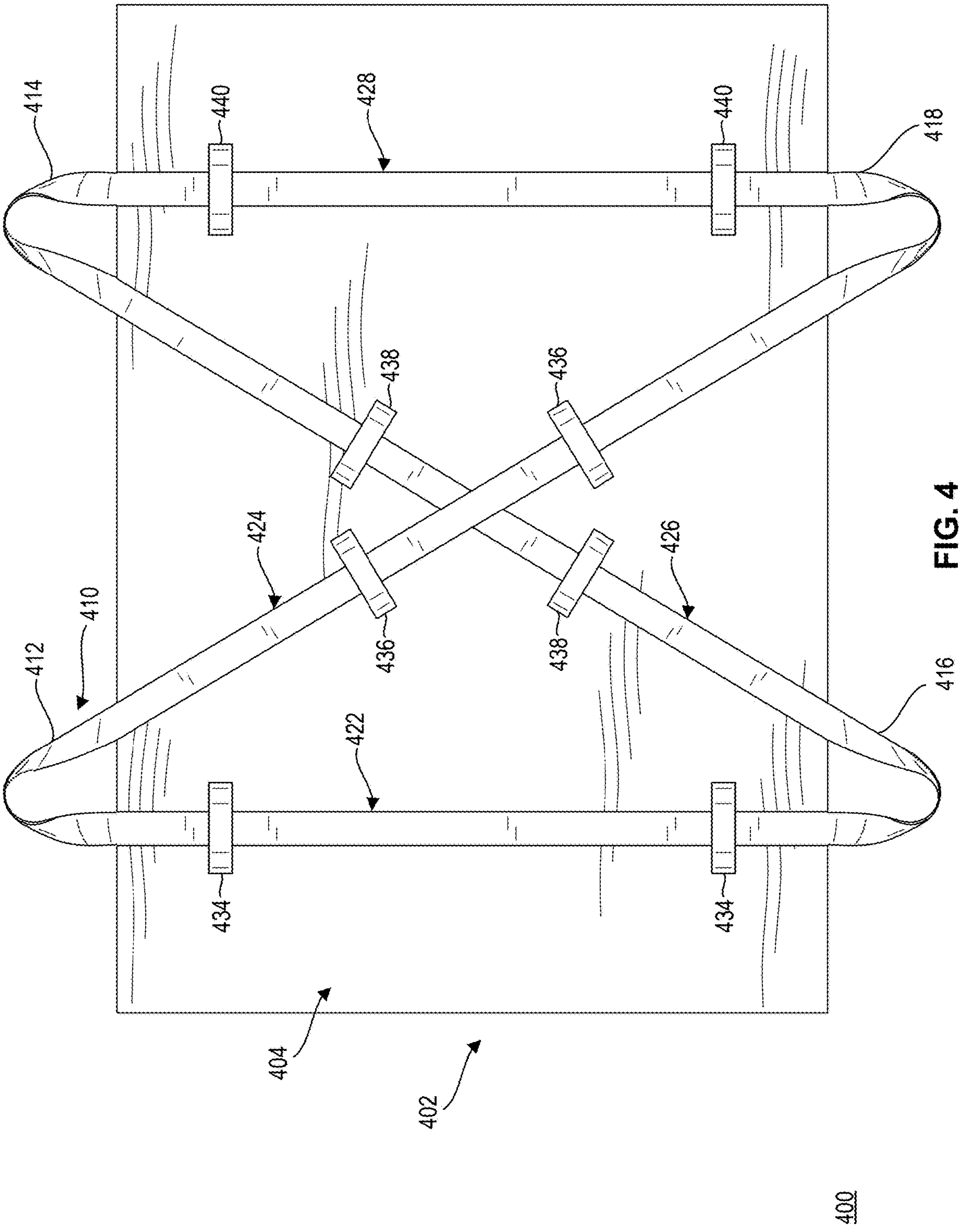
FIG. 4 illustrates a bottom view of another embodiment of an animal cadaver bag, in accordance with implementations of the disclosed subject matter.

The specific position and quantity of the strap guides 324, 326, 328, and 330 shown in FIG. 3 are provided by way of example and do not limit the scope of the principles described herein. For example, FIG. 4 illustrates an example animal cadaver bag 400 that includes a bag body 402 with a bottom surface 404 (e.g., similar to bag body 102 of animal cadaver bag 100, which includes bottom surface 124) and strap(s) 410 (e.g., similar to the strap(s) 110 of animal cadaver bag 100). The strap(s) 410 define handles 412, 414, 416, and 418 (e.g., similar to handles 112, 114, 116, and 118) and strap segments 422, 424, 426, and 428 (e.g., similar to strap segments 302, 304, 306, and 308). Animal cadaver bag 400 of the example shown in FIG. 4 includes strap guides 434 that secure strap segment 422 to the bottom surface 404 of the bag body 402, strap guides 436 that secure strap segment 424 to the bottom surface 404 of the bag body 402, strap guides 438 that secure strap segment 426 to the bottom surface 404 of the bag body 402, and strap guides 440 that secure strap segment 428 to the bottom surface 404 of the bag body 402. Strap guides 436 and 438 shown in FIG. 4 are illustrated at different positions on the bottom surface 404 of the bag body 402 relative to the positions of strap guides 326 and 328 on the bottom surface 124 of animal cadaver bag 100 as shown in FIG. 3. Other positional configurations and/or quantities of strap guides are possible.

Figure 5:
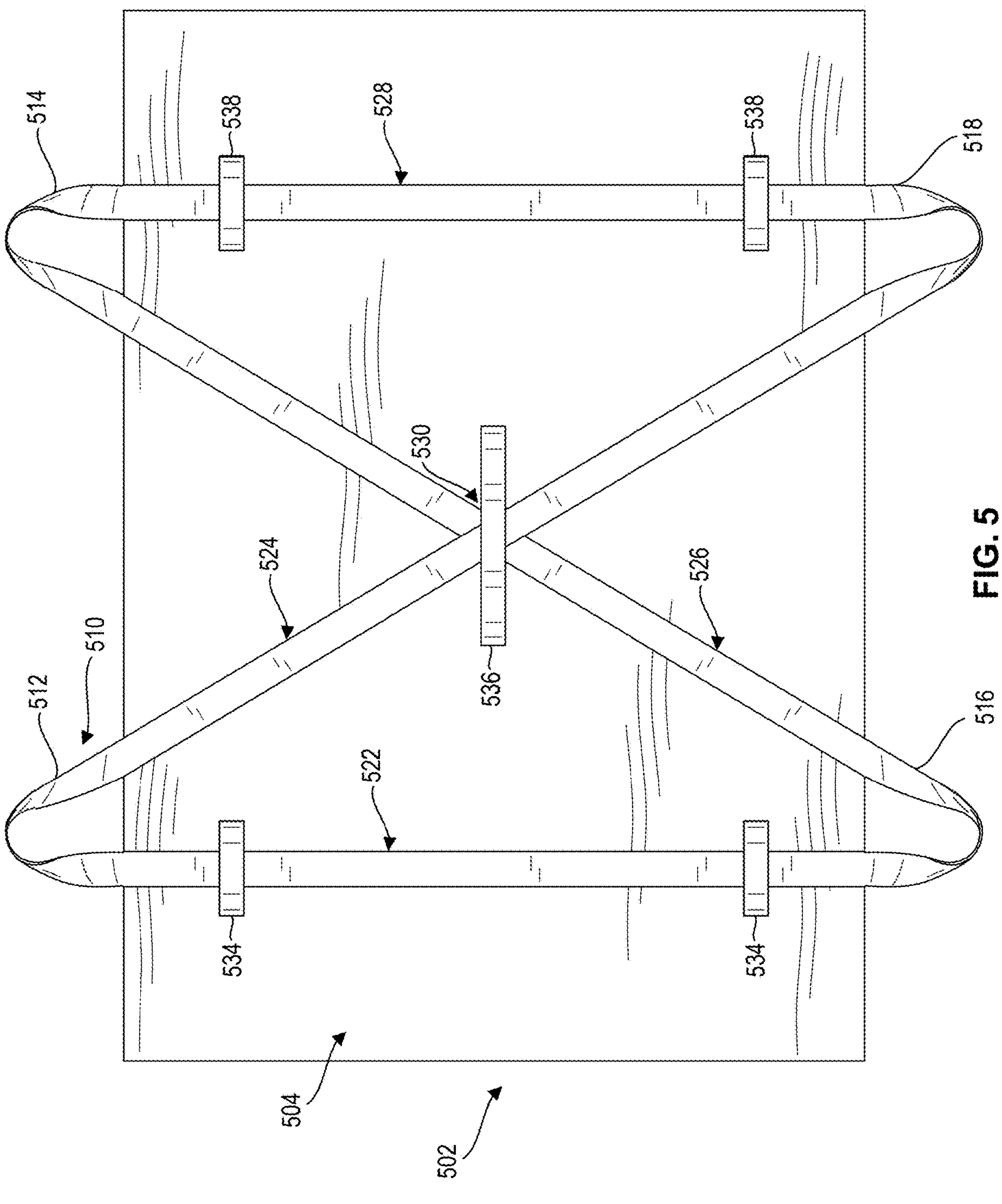
FIG. 5 illustrates a bottom view of another embodiment of an animal cadaver bag, in accordance with implementations of the disclosed subject matter.

For example, FIG. 5 illustrates an example animal cadaver bag 500 that includes a bag body 502 with a bottom surface 504 (e.g., similar to bag body 102 of animal cadaver bag 100, which includes bottom surface 124) and strap(s) 510 (e.g., similar to the strap(s) 110 of animal cadaver bag 100). The strap(s) 510 define handles 512, 514, 516, and 518 (e.g., similar to handles 112, 114, 116, and 118) and strap segments 522, 524, 526, and 528 (e.g., similar to strap segments 302, 304, 306, and 308). Animal cadaver bag 500 of the example shown in FIG. 5 includes strap guides 534 that secure strap segment 522 to the bottom surface 504 of the bag body 502, strap guide 536 that secures strap segments 524 and 526 to the bottom surface 504 of the bag body 502 (e.g., at a strap overlap region 530), and strap guides 538 that secure strap segment 528 to the bottom surface 504 of the bag body 502.

Figure 6:
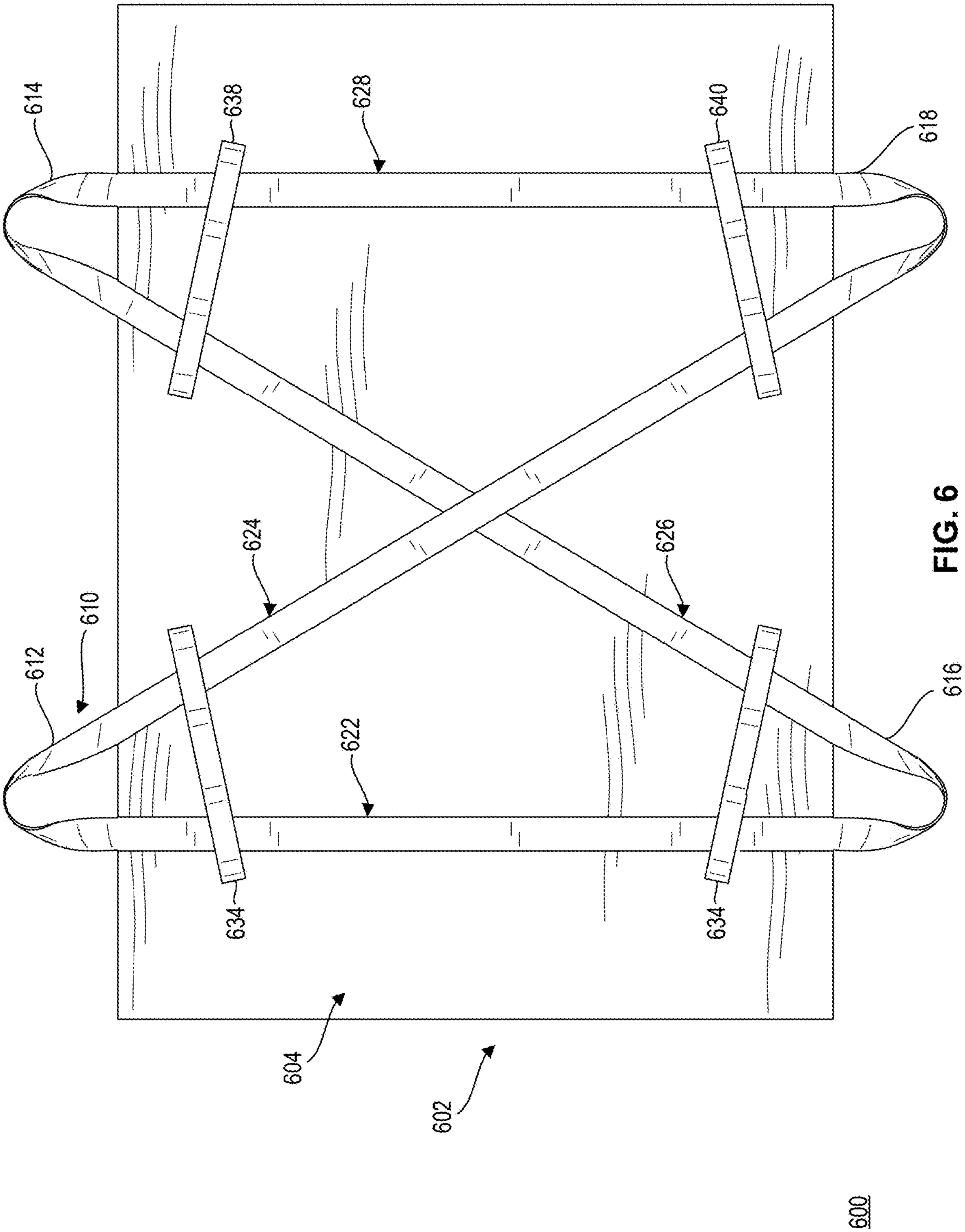
FIG. 6 illustrates a bottom view of another embodiment of an animal cadaver bag, in accordance with implementations of the disclosed subject matter.
Figure 7:
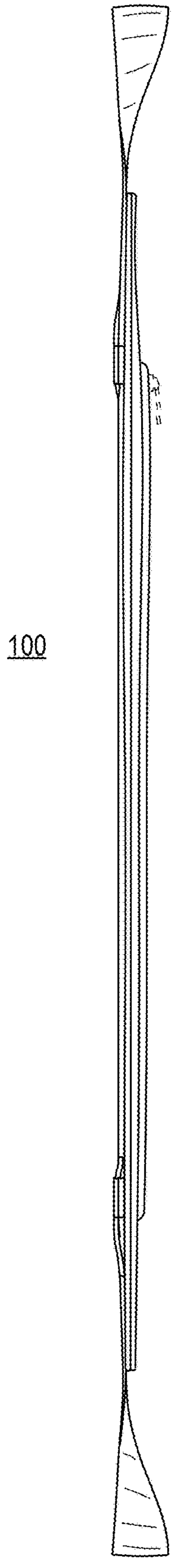
FIGS. 7, 8, 9, and 10 illustrate various side views of an animal cadaver bag, in accordance with implementations of the disclosed subject matter.
Figure 8:
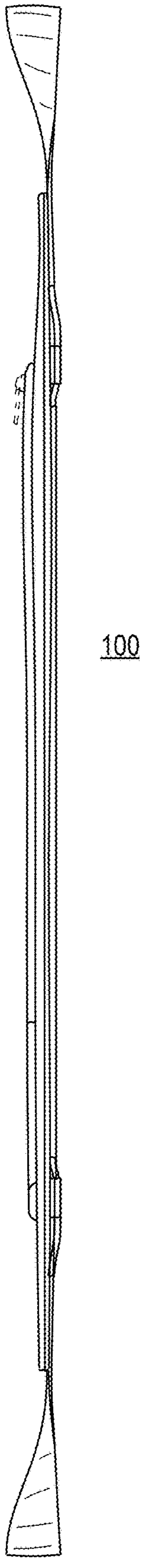
Figure 9:
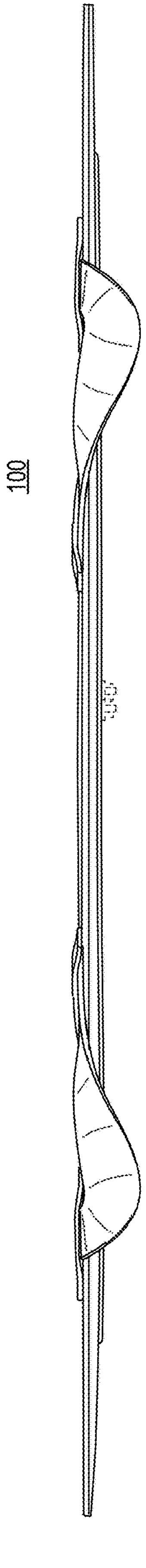
Figure 10:
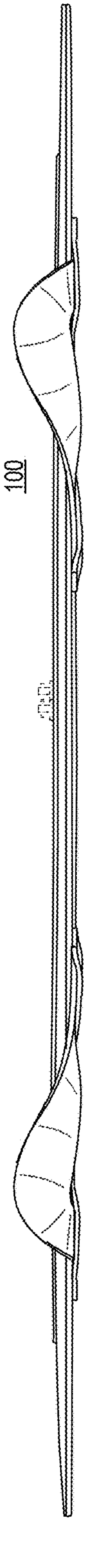

As another example, FIG. 6 illustrates an example animal cadaver bag 600 that includes a bag body 602 with a bottom surface 604 (e.g., similar to bag body 102 of animal cadaver bag 100, which includes bottom surface 124) and strap(s) 610 (e.g., similar to the strap(s) 110 of animal cadaver bag 100). The strap(s) 610 define handles 612, 614, 616, and 618 (e.g., similar to handles 112, 114, 116, and 118) and strap segments 622, 624, 626, and 628 (e.g., similar to strap segments 302, 304, 306, and 308). Animal cadaver bag 600 of the example shown in FIG. 6 includes strap guide 634 that secures strap segments 622 and 624 to the bottom surface 604 of the bag body 602, strap guide 636 that secures strap segments 622 and 626 to the bottom surface 604 of the bag body 602, strap guide 638 that secures strap segments 626 and 628 to the bottom surface 604 of the bag body 602, and strap guide 640 that secures strap segments 624 and 628 to the bottom surface 604 of the bag body 602.

The strap guides 634, 636, 638, and 640 can be connected to the bottom surface 604 of the bag body 602 at multiple points along the length thereof (e.g., on or near opposing ends and on one or more intermediate points) to form multiple openings between the bottom surface 604 and the strap guides 634, 636, 638, and 640 through which strap segments may extend.

FIGS. 7, 8, 9, and 10 illustrate various side views of the animal cadaver bag 100 shown and described hereinabove with reference to FIGS. 1, 2, and 3.

Embodiments disclosed herein can include those in the following numbered clauses:

Clause 1. An animal cadaver bag, comprising: a bag body defining a bag interior, the bag body comprising a top surface and an opposing bottom surface, wherein the top surface defines a bag opening for accessing the bag interior, the bag opening being selectively openable and closable; and one or more straps that define at least a first plurality of handles at a first side of the bag body and a second plurality of handles at an opposing second side of the bag body, wherein the one or more straps define a plurality of strap segments that extends across the bottom surface of the bag body between the first plurality of handles and the second plurality of handles, the plurality of strap segments comprising: a first strap segment extending from a first handle of the first plurality of handles to a first handle of the second plurality of handles; a second strap segment extending from the first handle of the first plurality of handles to a second handle of the second plurality of handles; a third strap segment extending from the first handle of the second plurality of handles to a second handle of the first plurality of handles; and a fourth strap segment extending from the second handle of the first plurality of handles to the second handle of the second plurality of handles.

Clause 2. The animal cadaver bag of clause 1, wherein the second strap segment and the third strap segment overlap one another to form a strap overlap region along the bottom surface of the bag body.

Clause 3. The animal cadaver bag of clause 2, wherein the second strap segment and the third strap segment form an x shape along the bottom surface of the bag body.

Clause 4. The animal cadaver bag of clause 2, further comprising: a strap guide securing the second strap segment and the third strap segment at the strap overlap region to the bottom surface of the bag body; a first plurality of strap guides securing the first strap segment to the bottom surface of the bag body; and a second plurality of strap guides securing the fourth strap to the bottom surface of the bag body.

Clause 5. The animal cadaver bag of clause 2, further comprising: a first plurality of strap guides securing the first strap segment to the bottom surface of the bag body; a second plurality of strap guides securing the second strap segment to the bottom surface of the bag body; a third plurality of strap guides securing the third strap segment to the bottom surface of the bag body; and a fourth plurality of strap guides securing the fourth strap segment to the bottom surface of the bag body.

Clause 6. The animal cadaver bag of clause 2, further comprising: a first strap guide that secures the first strap segment and the second strap segment to the bottom surface of the bag body; a second strap guide that secures the first strap segment and the third strap segment to the bottom surface of the bag body; a third strap guide that secures the third strap segment and the fourth strap segment to the bottom surface of the bag body; and a fourth strap guide that secures the second strap segment and the fourth strap segment to the bottom surface of the bag body.

Clause 7. The animal cadaver bag of clause 1, wherein the bag opening is selectively openable and closable via a zipper system.

Clause 8. The animal cadaver bag of clause 1, wherein the top surface comprises a rectangular shape.

Clause 9. The animal cadaver bag of clause 8, wherein the bag opening comprises at least three connected linear segments that are inwardly offset from three corresponding linear border segments of the top surface.

Clause 10. The animal cadaver bag of clause 1, wherein, when in a fully open configuration, the bag opening uncovers at least 30% of the top surface to expose the bag interior.

Clause 11. The animal cadaver bag of clause 1, wherein the one or more straps comprise a single strap.

Clause 12. The animal cadaver bag of clause 1, wherein each handle of the first plurality of handles and each handle of the second plurality of handles extends outward from the bag body by a distance less than 30% of a width of the bag body between the first plurality of handles and the second plurality of handles.

Clause 13. An animal cadaver bag, comprising: a bag body defining a bag interior, the bag body comprising a top surface and an opposing bottom surface, wherein the top surface defines a bag opening for accessing the bag interior, the bag opening being selectively openable and closable; and one or more straps that define at least a first plurality of handles at a first side of the bag body and a second plurality of handles at an opposing second side of the bag body, wherein the one or more straps define a plurality of strap segments that extends across the bottom surface of the bag body between the first plurality of handles and the second plurality of handles, wherein the one or more straps define a first strap loop and a second strap loop, wherein: the first strap loop is defined by: a first handle of the first plurality of handles, a first handle of the second plurality of handles, a first strap segment of the plurality of strap segments that extends from the first handle of the first plurality of handles to the first handle of the second plurality of handles, a first part of a second strap segment of the plurality of strap segments that extends from the first handle of the first plurality of handles to a second handle of the second plurality of handles, and a first part of a third strap segment of the plurality of strap segments that extends from the first handle of the second plurality of handles to a second handle of the first plurality of handles, and the second strap loop is defined by: the second handle of the first plurality of handles, a second handle of the second plurality of handles, a second part of the second strap segment of the plurality of strap segments that extends from the first handle of the first plurality of handles to the second handle of the second plurality of handles, a second part of the third strap segment of the plurality of strap segments that extends from the first handle of the second plurality of handles to the second handle of the first plurality of handles, and a fourth strap segment of the plurality of strap segments that extends from the second handle of the first plurality of handles to the second handle of the second plurality of handles.

Clause 14. The animal cadaver bag of clause 13, wherein the second strap segment and the third strap segment overlap one another to form a strap overlap region along the bottom surface of the bag body.

Clause 15. The animal cadaver bag of clause 14, further comprising: a strap guide securing the second strap segment and the third strap segment at the strap overlap region to the bottom surface of the bag body; a first plurality of strap guides securing the first strap segment to the bottom surface of the bag body; and a second plurality of strap guides securing the fourth strap to the bottom surface of the bag body.

Clause 16. The animal cadaver bag of clause 14, further comprising: a first plurality of strap guides securing the first strap segment to the bottom surface of the bag body; a second plurality of strap guides securing the second strap segment to the bottom surface of the bag body; a third plurality of strap guides securing the third strap segment to the bottom surface of the bag body; and a fourth plurality of strap guides securing the fourth strap segment to the bottom surface of the bag body.

Clause 17. The animal cadaver bag of clause 14, further comprising: a first strap guide that secures the first strap segment and the second strap segment to the bottom surface of the bag body; a second strap guide that secures the first strap segment and the third strap segment to the bottom surface of the bag body; a third strap guide that secures the third strap segment and the fourth strap segment to the bottom surface of the bag body; and a fourth strap guide that secures the second strap segment and the fourth strap segment to the bottom surface of the bag body.

Clause 18. The animal cadaver bag of clause 13, wherein, when in a fully open configuration, the bag opening uncovers at least 30% of the top surface to expose the bag interior.

Clause 19. The animal cadaver bag of clause 13, wherein each handle of the first plurality of handles and each handle of the second plurality of handles extends outward from the bag body by a distance less than 30% of a width of the bag body between the first plurality of handles and the second plurality of handles.

Clause 20. An animal cadaver bag, comprising: a bag body defining a bag interior, the bag body comprising a top surface and an opposing bottom surface, wherein the top surface defines a bag opening for accessing the bag interior, the bag opening being selectively openable and closable; and one or more straps that define at least a first plurality of handles at a first side of the bag body and a second plurality of handles at an opposing second side of the bag body, wherein the one or more straps define a plurality of strap segments that extends across the bottom surface of the bag body between the first plurality of handles and the second plurality of handles, and wherein at least a first strap segment of the plurality of strap segments and a second strap segment of the plurality of strap segments overlap one another to form a strap overlap region along the bottom surface of the bag body.

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or regions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

What is currently claimed is:

1. An animal cadaver bag, comprising:

a bag body defining a bag interior, the bag body comprising a top surface and an opposing bottom surface, wherein the top surface defines a bag opening for accessing the bag interior, the bag opening being selectively openable and closable;

one or more straps that define at least a first plurality of handles at a first side of the bag body and a second plurality of handles at an opposing second side of the bag body, wherein the one or more straps define a plurality of strap segments that extends across the bottom surface of the bag body between the first plurality of handles and the second plurality of handles, the plurality of strap segments comprising:

a first strap segment extending from a first handle of the first plurality of handles to a first handle of the second plurality of handles;

a second strap segment extending from the first handle of the first plurality of handles to a second handle of the second plurality of handles;

a third strap segment extending from the first handle of the second plurality of handles to a second handle of the first plurality of handles, wherein the second strap segment and the third strap segment overlap one another to form a strap overlap region along the bottom surface of the bag body; and a fourth strap segment extending from the second handle of the first plurality of handles to the second handle of the second plurality of handles;

a first plurality of strap guides securing the first strap segment to the bottom surface of the bag body;

a second plurality of strap guides securing the second strap segment to the bottom surface of the bag body;

a third plurality of strap guides securing the third strap segment to the bottom surface of the bag body, and a fourth plurality of strap guides securing the fourth strap segment to the bottom surface of the bag body.

2. The animal cadaver bag of claim 1, wherein the strap overlap region has an x shape.

3. The animal cadaver bag of claim 1, further comprising:

a strap guide securing the second strap segment and the third strap segment at the strap overlap region to the bottom surface of the bag body.

4. The animal cadaver bag of claim 1, wherein the bag opening is selectively openable and closable via a zipper system.

5. The animal cadaver bag of claim 1, wherein the top surface comprises a rectangular shape.

6. The animal cadaver bag of claim 5, wherein the bag opening comprises at least three connected linear segments that are inwardly offset from three corresponding linear border segments of the top surface.

7. The animal cadaver bag of claim 6, wherein the bag opening comprises a partial segment that extends from a first linear segment toward a second linear segment by a distance that is less than about 50% of a distance between the first linear segment and the second linear segment.

8. The animal cadaver bag of claim 1, wherein, when in a fully open configuration, the bag opening uncovers at least 30% of the top surface to expose the bag interior.

9. The animal cadaver bag of claim 1, wherein the one or more straps comprise a single strap.

10. The animal cadaver bag of claim 1, wherein each handle of the first plurality of handles and each handle of the second plurality of handles extends outward from the bag body by a distance less than 30% of a width of the bag body between the first plurality of handles and the second plurality of handles.

11. An animal cadaver bag, comprising:

a bag body defining a bag interior, the bag body comprising a top surface and an opposing bottom surface, wherein the top surface defines a bag opening for accessing the bag interior, the bag opening being selectively openable and closable; and one or more straps that define at least a first plurality of handles at a first side of the bag body and a second plurality of handles at an opposing second side of the bag body, wherein the one or more straps define a plurality of strap segments that extends across the bottom surface of the bag body between the first plurality of handles and the second plurality of handles, wherein the one or more straps define a first strap loop and a second strap loop, wherein:

the first strap loop is defined by:

a first handle of the first plurality of handles, a first handle of the second plurality of handles, a first strap segment of the plurality of strap segments that extends from the first handle of the first plurality of handles to the first handle of the second plurality of handles, a first part of a second strap segment of the plurality of strap segments that extends from the first handle of the first plurality of handles to a second handle of the second plurality of handles, and a first part of a third strap segment of the plurality of strap segments that extends from the first handle of the second plurality of handles to a second handle of the first plurality of handles, and the second strap loop is defined by:

the second handle of the first plurality of handles, a second handle of the second plurality of handles, a second part of the second strap segment of the plurality of strap segments that extends from the first handle of the first plurality of handles to the second handle of the second plurality of handles, a second part of the third strap segment of the plurality of strap segments that extends from the first handle of the second plurality of handles to the second handle of the first plurality of handles, and a fourth strap segment of the plurality of strap segments that extends from the second handle of the first plurality of handles to the second handle of the second plurality of handles, wherein the second strap segment and the third strap segment overlap one another to form a strap overlap region along the bottom surface of the bag body;

a first strap guide that secures the first strap segment and the second strap segment to the bottom surface of the bag body;

a second strap guide that secures the first strap segment and the third strap segment to the bottom surface of the bag body;

a third strap guide that secures the third strap segment and the fourth strap segment to the bottom surface of the bag body; and a fourth strap guide that secures the second strap segment and the fourth strap segment to the bottom surface of the bag body.

12. The animal cadaver bag of claim 11, further comprising:

a strap guide securing the second strap segment and the third strap segment at the strap overlap region to the bottom surface of the bag body.

13. The animal cadaver bag of claim 11, wherein, when in a fully open configuration, the bag opening uncovers at least 30% of the top surface to expose the bag interior.

* * * * *